(12) United States Patent
Ye

(10) Patent No.: US 11,919,358 B2
(45) Date of Patent: Mar. 5, 2024

(54) SUSPENSION SYSTEM AND A CARRYING MOBILE ROBOT

(71) Applicant: SUZHOU UMORE ROBOTICS CO., LTD., Suzhou (CN)

(72) Inventor: Lei Ye, Suzhou (CN)

(73) Assignee: SUZHOU UMORE ROBOTICS CO., LTD., Suzhou (CN)

( * ) Notice: Subject to any disclaimer, the term of this patent is extended or adjusted under 35 U.S.C. 154(b) by 1398 days.

(21) Appl. No.: 16/331,885

(22) PCT Filed: Jul. 12, 2018

(86) PCT No.: PCT/CN2018/095441
§ 371 (c)(1),
(2) Date: Mar. 8, 2019

(87) PCT Pub. No.: WO2020/010575
PCT Pub. Date: Jan. 16, 2020

(65) Prior Publication Data
US 2021/0331542 A1    Oct. 28, 2021

(30) Foreign Application Priority Data

Jul. 11, 2018    (CN) .......................... 201810759757.7

(51) Int. Cl.
*B60G 3/14*    (2006.01)
*B66F 5/02*    (2006.01)
(Continued)

(52) U.S. Cl.
CPC ................ *B60G 3/14* (2013.01); *B66F 5/025* (2013.01); *B66F 9/063* (2013.01);
(Continued)

(58) Field of Classification Search
CPC ................ B60G 3/14; B60G 2204/143; B60G 2800/20; B66F 5/025; B66F 9/07572;
(Continued)

(56) References Cited

FOREIGN PATENT DOCUMENTS

| CN | 101665059 A | * | 3/2010 |
| CN | 101665059 A |   | 3/2010 |

(Continued)

OTHER PUBLICATIONS

CN-201856248-U Machine English translation (Year: 2011).*
CN-101665059-A Machine English translation (Year: 2010).*

*Primary Examiner* — Jason D Shanske
*Assistant Examiner* — Matthew James O'Neill
(74) *Attorney, Agent, or Firm* — SZDC Law PC

(57) ABSTRACT

A carrying mobile robot includes a frame, a suspension system disposed at the bottom of the frame, and a lifting mechanism disposed on the frame. The suspension system includes two suspension mechanisms disposed on the left and right sides, each of which includes a supporting beam, a driving wheel, a connecting member and a first driven wheel. The first driven wheel and the driving wheel respectively support the front and rear ends of the supporting beam, and the connecting member is connected to the supporting beam and located between the driving wheel and the first driven wheels. The lifting mechanism includes a plurality of lifting members, a first driving system for driving the lifting member and a transmission system for transmitting the driving force of the first drive system to the lifting members.

8 Claims, 12 Drawing Sheets

(51) Int. Cl.
 *B66F 9/06* (2006.01)
 *B66F 9/075* (2006.01)
(52) U.S. Cl.
 CPC ...... *B66F 9/07572* (2013.01); *B66F 9/07586* (2013.01); *B60G 2204/143* (2013.01); *B60G 2800/20* (2013.01); *B66F 2700/04* (2013.01)
(58) Field of Classification Search
 CPC .. B66F 9/07586; B66F 2700/04; B66F 9/061; B66F 3/08; B66F 7/02; B66F 7/0608; B66F 7/14
 See application file for complete search history.

(56) References Cited

FOREIGN PATENT DOCUMENTS

| | | | |
|---|---|---|---|
| CN | 201856248 U | * | 6/2011 |
| CN | 201856248 U | | 6/2011 |
| CN | 104809606 A | | 7/2015 |
| CN | 205819329 U | | 12/2016 |
| CN | 106354131 A | | 1/2017 |
| CN | 107000943 A | | 8/2017 |
| CN | 207208027 U | | 4/2018 |
| JP | 2001233260 A | | 8/2001 |

* cited by examiner

SUSPENSION SYSTEM AND A CARRYING MOBILE ROBOT

This application is the National Stage Application of PCT/CN2018/095441, filed on Jul. 12, 2018, which claims priority to Chinese Patent Application No.: 201810759757.7, filed on Jul. 11, 2018, which is incorporated by reference for all purposes as if fully set forth herein.

TECHNICAL FIELD

The present application relates to the field of mobile robot technology, in particular to a suspension system and a carrying mobile robot using the suspension system.

TECHNICAL BACKGROUND

With the advancement of technology, more and more enterprises are shifting to a smart factory model. Among them, the role of the automatic guided vehicle (AGV) cannot be underestimated. This intelligent mobile robot performs the function of "porter" in the factory. The use of the automatic guided transport vehicle not only greatly improves the actual operation efficiency of the factory, but also releases workers from daily monotonous and frequent tasks, reducing the rate of job turnover and liberating the labor force.

In the field of mobile robots, the movement of the robot mainly relies on the driving wheel to provide power, and the driving wheel power is mainly ensured by the friction and touch ground pressure of the wheel. The greater the touch ground pressure, the greater the friction, so it is important to ensure the driving wheel having sufficient touch ground pressure. In order to ensure that the driving wheel remains in contact with the ground, it is now common to separately drive the driving wheel into a suspended form, using a spring to support the driving wheel. Thus, for a mobile robot, the touch ground pressure of the driving wheel is related to the spring force supporting the driving wheel, which is a constant value. However, in this case, there will be several problems: ① When the load is relatively large, the friction force of the driving force to the ground is constant since the spring force is constant, which would likely to cause the phenomenon that the driving wheel slips; ② if the spring force is designed to accommodate a large load, the spring itself would be designed to be relatively large. In this case, when the robot is unloaded, the spring force of the driving wheel may lift the robot up, causing the driven wheel to hang; ③ during climbing or crossing a barrier, since the front driven wheel is too high, the intermediate driving wheel's spring would be elongated (pressure spring) or shortened (tension spring), thus the spring force becomes smaller and the touch ground pressure of the driving wheel as well, causing the slip phenomenon is likely to occur. ④ On a road with complicated terrain, the force of the driving wheel's spring may be reduced due to across a pit, so it is impossible to continue normal driving. For the above technical problem, there is now a patent publication CN107235092A in prior art: the technology disclosed in the chassis device of an adaptive mobile robot, solves the above technical problem correspondingly. Nevertheless, there is also another thorny problem. During the working process, the rotating joint between the swing arm and the chassis body is likely to cause bending deformation due to uneven force, which has limitations for the application of heavy load carrying operation And at the same time for the existing carrying storage logistics robot, when the load is lifted, it is limited by the overall strength of the mechanical structure, and has poor stability, thus the carrying capacity of this kind of carrying mobile robot is limited. The publication numbered CN104192762B, whose patent title is "a rotary jacking mechanism and an AGV trolley including the rotary jacking mechanism" discloses a mobile robot based on the rotary jacking mechanism, which has strong bearing capacity, good jacking stability, and large lifting stroke (up to 60~100 mm). However, the entire jacking mechanism is relatively bulky and occupies more installation space on the robot body. Moreover, the key component for achieving the jacking motion is a special large-diameter ball screw mechanism, which requires high processing precision and thus high cost. In terms of the implementation of the jacking motion, the electrical control of the robot body is also complicated, since the vehicle body needs to be differentially moved in the opposite direction with respect to the tray on the jacking mechanism.

SUMMARY OF THE INVENTION

The present invention aims to solve at least one of the technical problems existing in the prior art described above. To this end, the invention provides a suspension system in which a shaft of the suspension system is stressed evenly.

The present invention also provides a carrying mobile robot with the above suspension system.

In order to solve the technical problem above, the present application provides a suspension system, including two suspension mechanisms disposed on the left and right, respectively called a left suspension mechanism and a right suspension mechanism, each of which includes a supporting beam, a driving wheel, a connecting member, and a first driven wheel. The first driven wheel and the driving wheel respectively support front and rear ends of the supporting beam. And the connecting member is connected to the supporting beam and located between the driving wheel and the first driven wheel. The connecting member is generally in an inverted "U" shape. The connecting member includes a first vertical connecting portion disposed on a left side of the supporting beam, a second vertical connecting portion disposed on a right side of the supporting beam, and a horizontal connecting portion provided on an upper side of the supporting beam. The first vertical connecting portion and the second vertical connecting portion are rotatably connected to the supporting beam by a rotating shaft extending in a left-right direction.

Furthermore, a first sliding bearing is disposed between the first vertical connecting portion and the rotating shaft; an inner ring of the first sliding bearing is in clearance fit with the rotating shaft; an outer ring of the first sliding bearing is in interference fit with a hole wall of the first vertical connecting portion; a second sliding bearing is disposed between the second vertical connecting portion and the rotating shaft; the inner ring of the second sliding bearing is in clearance fit with the rotating shaft; the outer ring of the second sliding bearing is in interference fit with a hole wall of the second vertical connecting portion.

Furthermore, the driving wheel and the first driven wheel are both disposed on a lower mounting surface of the supporting beam; one side of the driving wheel is provided with a driving assembly for driving the driving wheel; the driving assembly is arranged in a line in the axial direction of the driving wheel; the driving assembly comprises a mounting flange; the mounting flange and the lower mounting surface of the supporting beam are connected.

A carrying mobile robot, comprising a frame, is characterized in that it further comprises the suspension system. The left suspension mechanism and the right suspension mechanism are detachably connected to the bottom of the frame respectively, through the horizontal connecting portion of the connecting member.

Furthermore, the frame is provided with a base plate, the base plate is provided with a lifting mechanism; the lifting mechanism comprises a plurality of lifting members, a first driving system for driving the lifting member and a transmission system for transmitting a driving force of the first driving system to the lifting member, the transmission system comprises a plurality of follower pulleys; each of the lifting members includes a set of ball screw nut pairs and a first mounting seat for mounting the ball screw nut pair; a lower end of the first mounting seat is provided with a fixing seat; the first mounting seat is disposed on the base plate; the ball screw nut pair includes a ball screw and a ball nut sleeved on the ball screw and matched with the ball screw; the fixing seat has a through hole for the ball screw; the first mounting seat has a pair of mounting chambers for axially limiting the ball nut; a pulley connector is further disposed between the follower pulley and the ball nut, with one end of the pulley connector connected to the follower pulley, and the other end of the pulley connector connected to the ball nut.

Furthermore, the pulley connecoris sleeved on the ball screw and the inside of the connector has a first annular groove; a T-shaped small end of the ball nut is embedded in the first circular annular groove; a notch of the first annular groove abuts against the surface of the T-shaped large end of the ball nut; the outer wall of the connector has a first annular boss; a deep groove ball bearing is sleeved on the first annular boss, the lower end surface of the inner ring of the deep groove ball bearing abuts against a step surface of the first annular boss, the upper end of the outer ring of the deep groove ball bearing abuts against the first mounting seat; the lower end of the ball nut is provided with a lower support disk; the lower support disk has a second annular groove and a boss extending away from the second annular groove; the lower support disk is sleeved on the ball screw; a T-shaped large end of the ball nut is embedded in the second annular groove; the outer wall of the boss is provided with a tapered roller bearing; the lower end surface of the tapered roller bearing is abutted against the fixing seat; the upper end surface of the tapered roller bearing abuts against the surface of the lower support disk.

Furthermore, the first driving system of the lifting mechanism comprises a driving motor; the transmission system comprises a driving pulley provided at an output end of the driving motor, a synchronous belt and a plurality of idlers disposed on the base plate; the synchronous belt is connected with the drive pulley, the follower pulley and the idlers.

Furthermore, four lifting members are respectively disposed at four corners of the base plate; four of six follower pulleys are disposed on the ball screw, and the other two are respectively disposed on one side of the two lifting members facing away from one end of the driving motor; five idlers are respectively disposed adjacent to the lifting members and one side of the driving pulley, wherein the idler adjacent to the driving pulley is disposed on a position adjustable mechanism to adjust tension of the synchronous belt.

Furthermore, the upper end of the ball screw is provided with a tray support frame; the tray support frame is provided with a tray; the tray is provided with an anti-skid pad along longitudinal direction.

Furthermore, a second driven wheel is further disposed at an end of the bottom of the frame facing away from the first driven wheel; and there are two second driven wheel, which are a second driven wheel on the same side with the left suspension mechanism and a second driven wheel on the same side with the right suspension mechanism.

The beneficial effects of the application are:
1) The present application provides a connecting member on the supporting beam, and the connecting member and the supporting beam are connected through a rotating shaft. Besides, a horizontal connecting portion is arranged on the upper surface of the connecting member, so that the rotating shaft is stressed uniformly and not bend out of shape;
2) It can reduce the wear between the supporting beam and the rotating shaft when the supporting beam is swinging around the rotating shaft by arranging the sliding bearing on the rotating shaft;
3) The driven wheel and the driving wheel of the present application are respectively installed on the lower mounting surface of the supporting beam, so that the operation is stable and the stress is evenly applied, and the driving components are arranged in a straight line, making the overall structure more compact;
4) The suspension system enables the driving wheel to obtain sufficient downforce, realizing smooth running;
5) The lifting mechanism of the present application is compact in structure, and the volume occupied on the robot body is small, the lifting stroke is large. Besides, it has high transmission efficiency and low noise. Moreover, in this present application, the axial force subjected by the ball screw during the lifting would be transmitted to the base plate in the end. Therefore, the lifting mechanism arranged as set forth in the present application can achieve a high load and a smooth lifting.

The above description is only an overview of the technical solutions of the present invention, and the technical means of the present invention can be more clearly understood through practical implementation in accordance with the contents of the specification. Hereinafter, the preferred embodiments of the present invention will be described in detail with reference to the accompanying drawings as follows.

wherein:

2 is a supporting beam. 4 is a driving wheel. 5 is a driving assembly. 501 is a first motor. 502 is a reducer. 503 is an encoder. 504 is a brake. 505 is a mounting bracket. 6 is a connecting member. 601 is a horizontal connecting portion. 602 is a first vertical connecting portion. 603 is a second vertical connecting portion. 7 is a left suspension mechanism. 8 is a first driven wheel. 9 is a right suspension mechanism. 10 is a rotating shaft. 12 is a first sliding bearing. 13 is a second sliding bearing. 14 is a frame. 1401 is a frame body. 1402 is an auxiliary frame. 1403 is a sensor support frame. 16 is a lifting member. 1601 is a ball screw. 1602 is a ball nut. 1603 is a first mounting seat. 1604 is a pulley connector. 1605 is a first annular groove. 1606 is a first annular boss. 1607 is a deep groove ball bearing. 1608 is a lower support disk. 1609 is a tapered roller bearing. 17 is a base plate. 18 is a first driving system. 19 is a fixing seat. 1801 is a second motor. 1802 is a first stage synchronous pulley. 1803 is a second stage reducer. 1804 is an output shaft. 20 is a transmission system. 2001 is a first follower pulley. 2002 is a driving pulley. 2003 is a synchronous belt. 2004 is an idler. 2005 is a second follower pulley. 22 is a tray support frame. 24 is a tray. 26 is a non-slip pad. 28 is a second driven wheel. 30 is a housing. 3001 is a front housing. 3002 is a rear housing. 3003 is a side housing. 32 is an anti-collision edge. 34 is a laser sensor. 36 is an ultrasonic sensor. 38 is a charging port. 40 is a touch switch. 42 is a horn. 44 is a controller. 46 is a magnetic induction sensor. 48 is a first material vehicle. 50 is a robot. and 52 is a control panel.

DETAILED DESCRIPTION OF THE EMBODIMENTS

The present application is further described in the following with reference to the accompanying drawings and specific embodiments, so that the present invention can be better understood and operated by a person skilled in the art, but the embodiments are not limited thereto for the present application.

Figure 1:
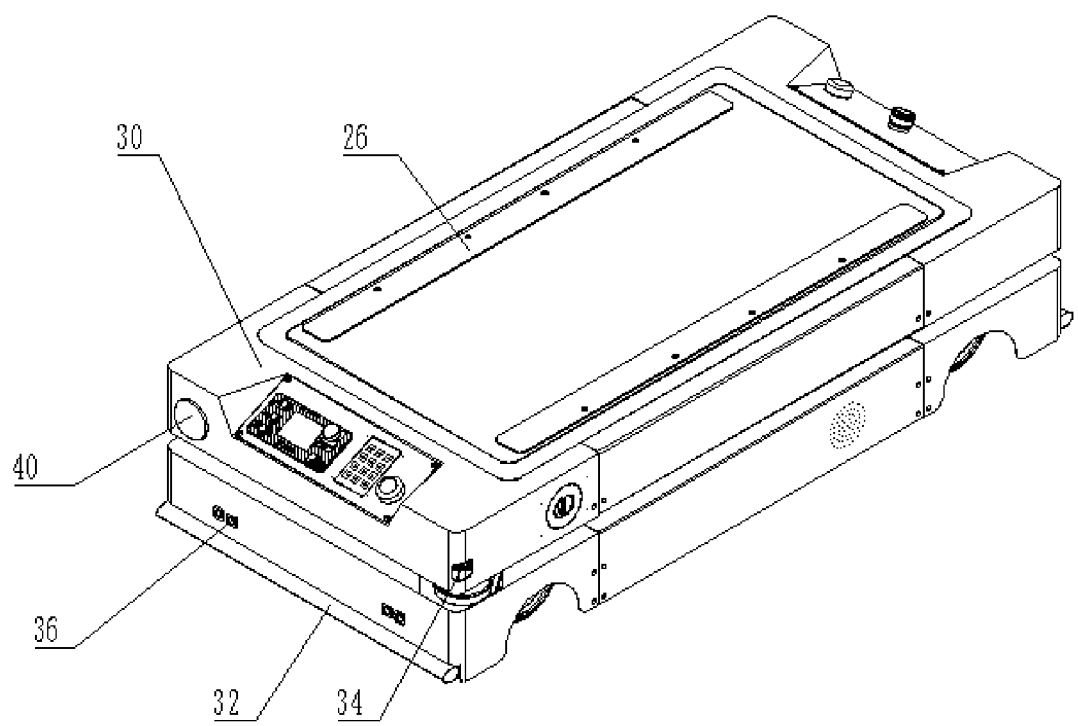
FIG. 1 is a schematically structural view of a carrying mobile robot of the present application.
Figure 2:
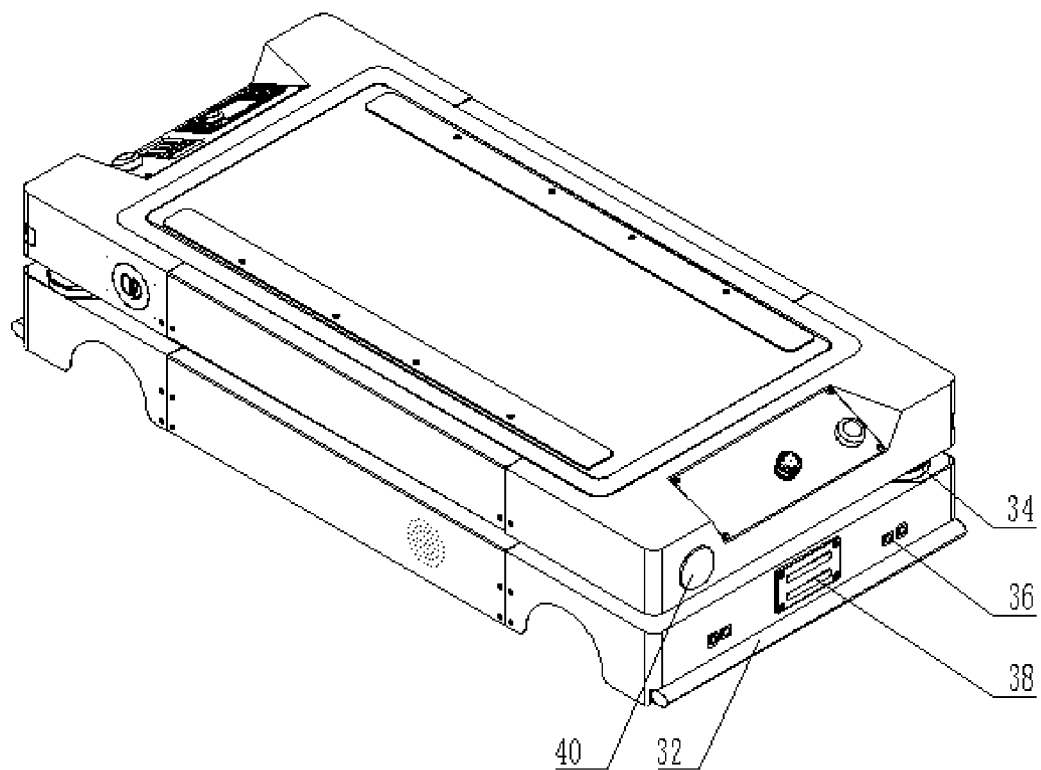
FIG. 2 is a schematic diagram of the carrying mobile robot of the present application from another perspective.
Figure 3:
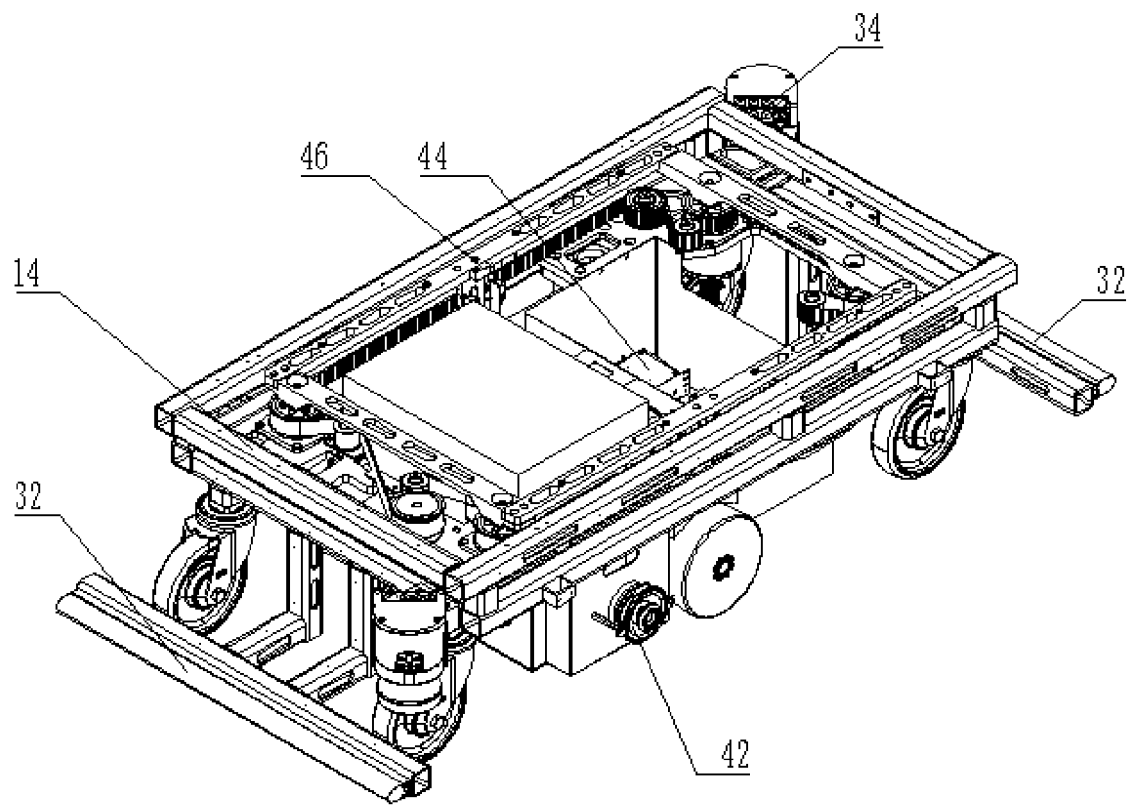
FIG. 3 is an internal isometric view of the carrying mobile robot of the present application.
Figure 4:
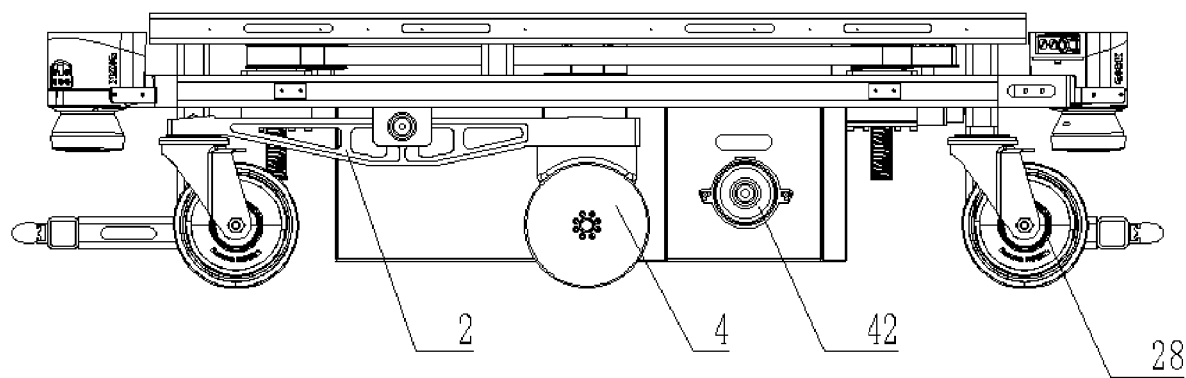
FIG. 4 is a front elevational view showing the internal structure of the carrying mobile robot of the present application.
Figure 5:
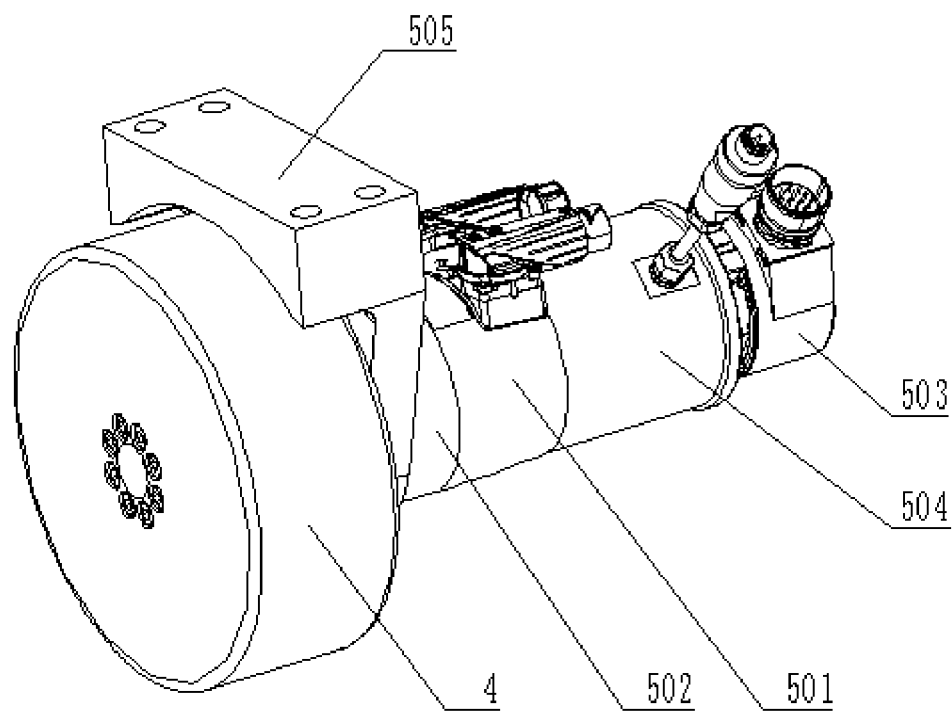
FIG. 5 is a schematic view of the driving wheel and driving assembly of the present application.
Figure 6:
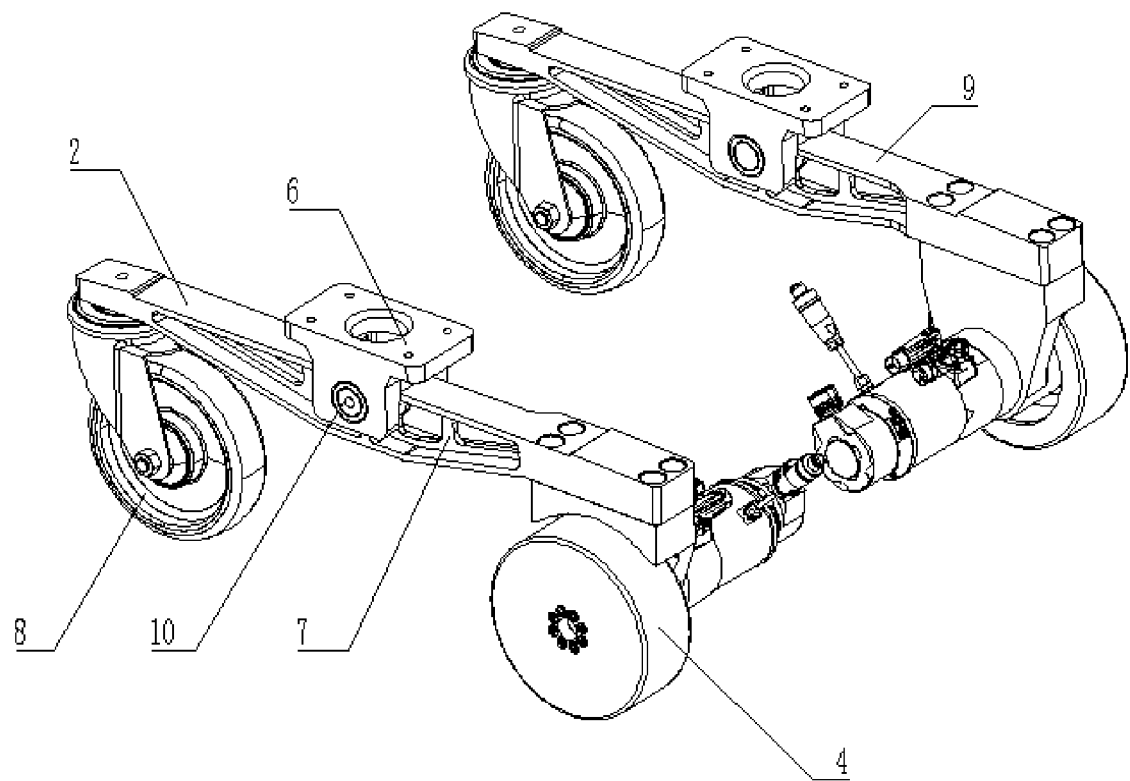
FIG. 6 is a schematic diagram of a suspension system of a full piggyback mobile robot of the present application.
Figure 7:
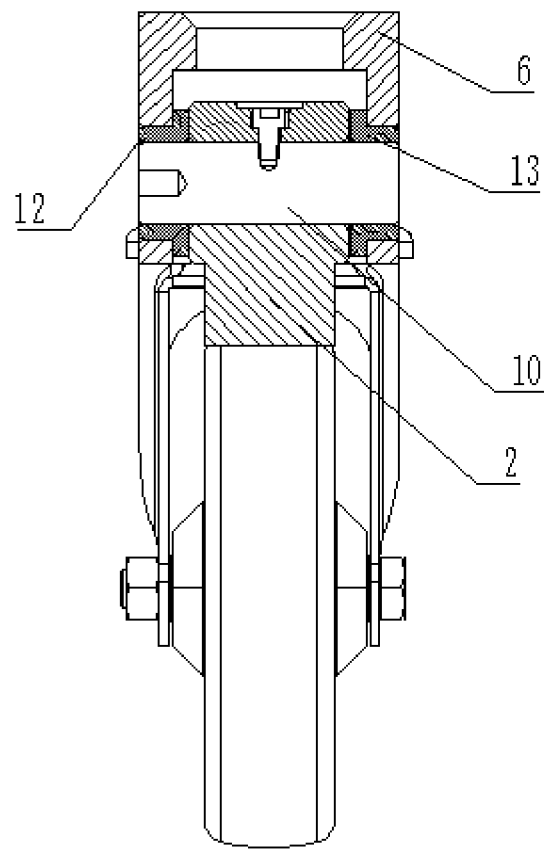
FIG. 7 is a cross-sectional view of the joint of the rotating shaft and the supporting beam of the present application.
Figure 8:
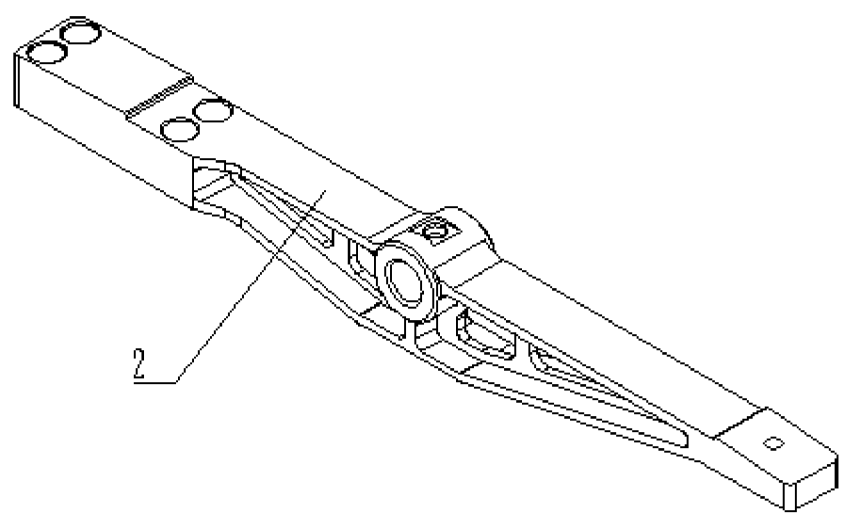
FIG. 8 is a schematic view of a supporting beam of the present application.
Figure 9:
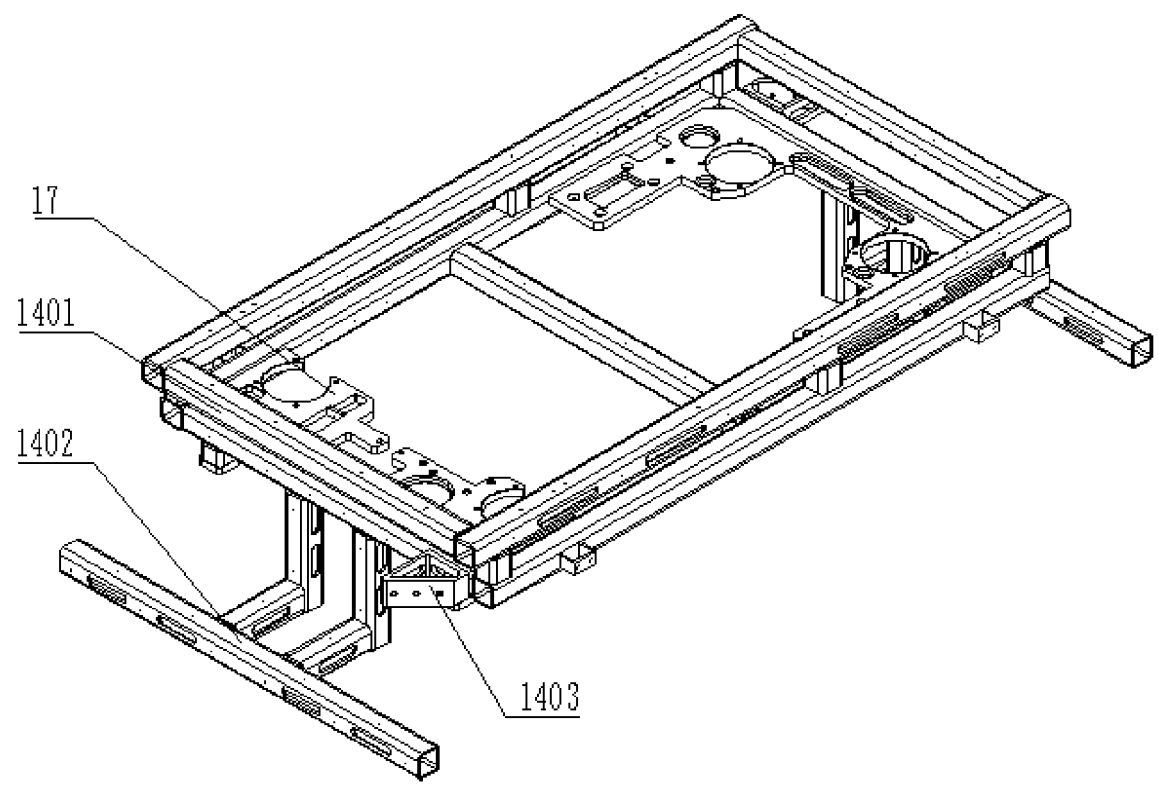
FIG. 9 is a schematic view of a frame of the present application.
Figure 10:
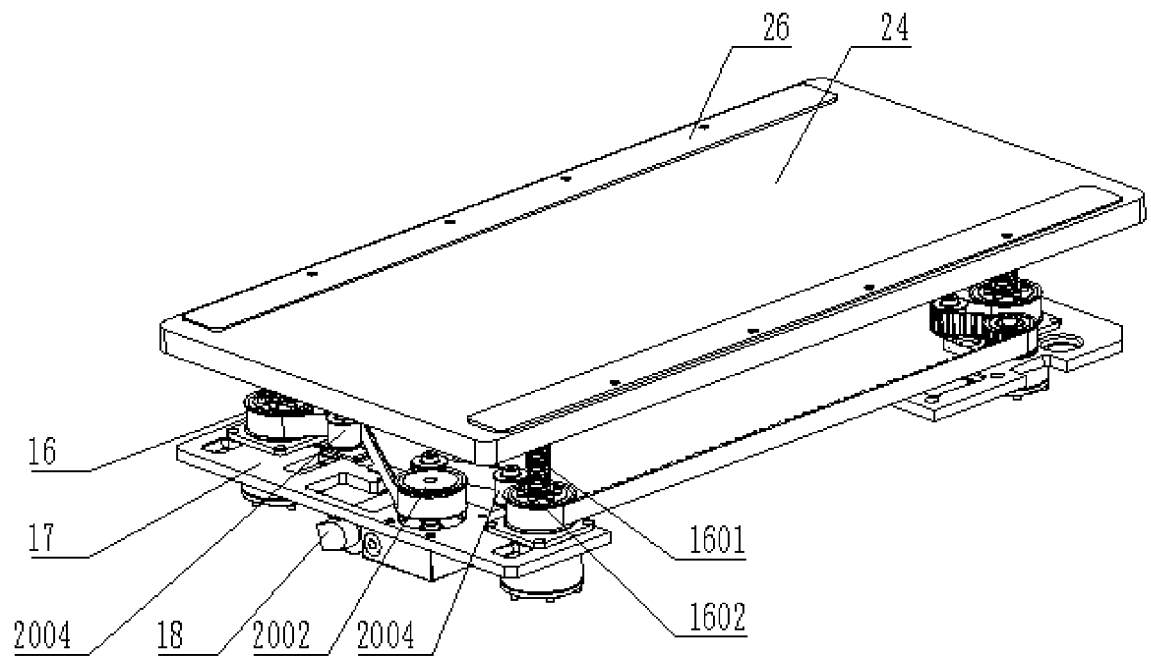
FIG. 10 is a schematic overall view of a lifting mechanism of the present application.
Figure 11:
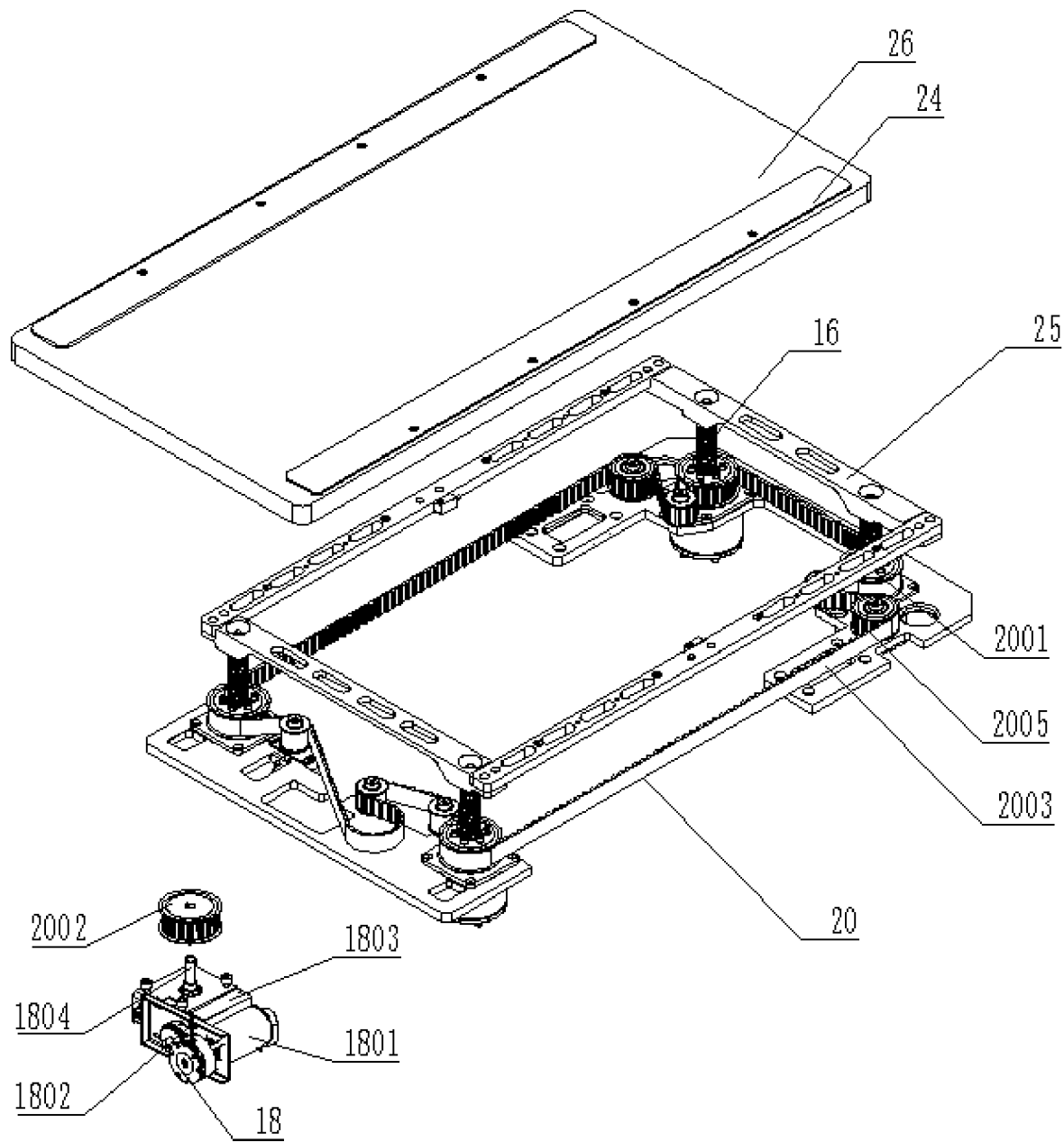
FIG. 11 is an exploded view of FIG. 10 of the present application.
Figure 12:
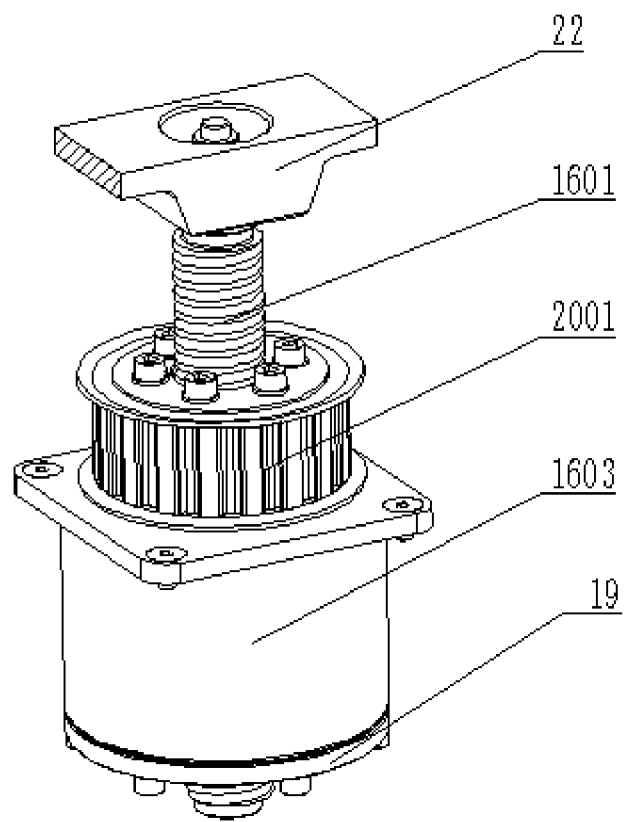
FIG. 12 is a schematic view of the lifting member of the present application.
Figure 13:
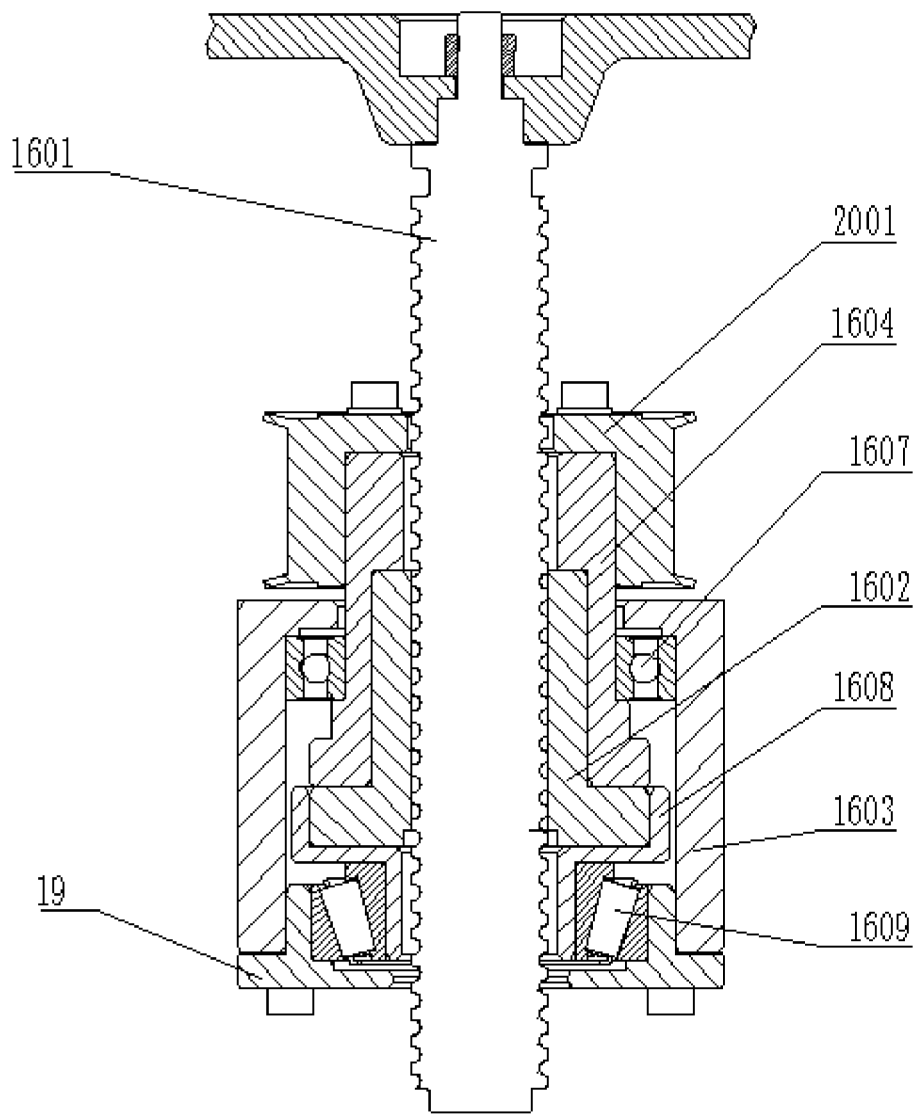
FIG. 13 is a cross-sectional view of the lifting member of the present application.
Figure 14:
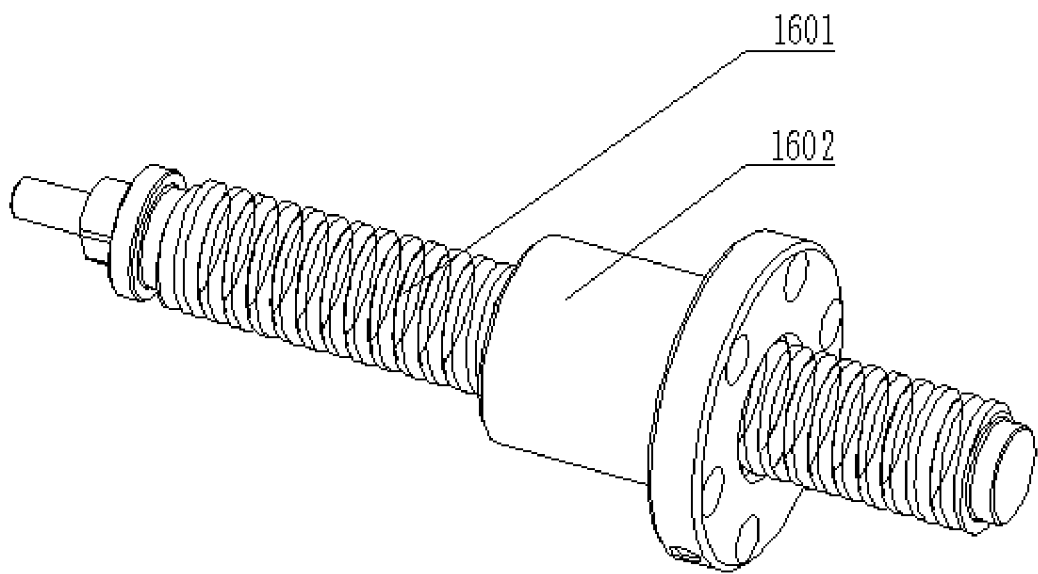
FIG. 14 is a schematic view of a ball screw nut pair of the present application.
Figure 15:
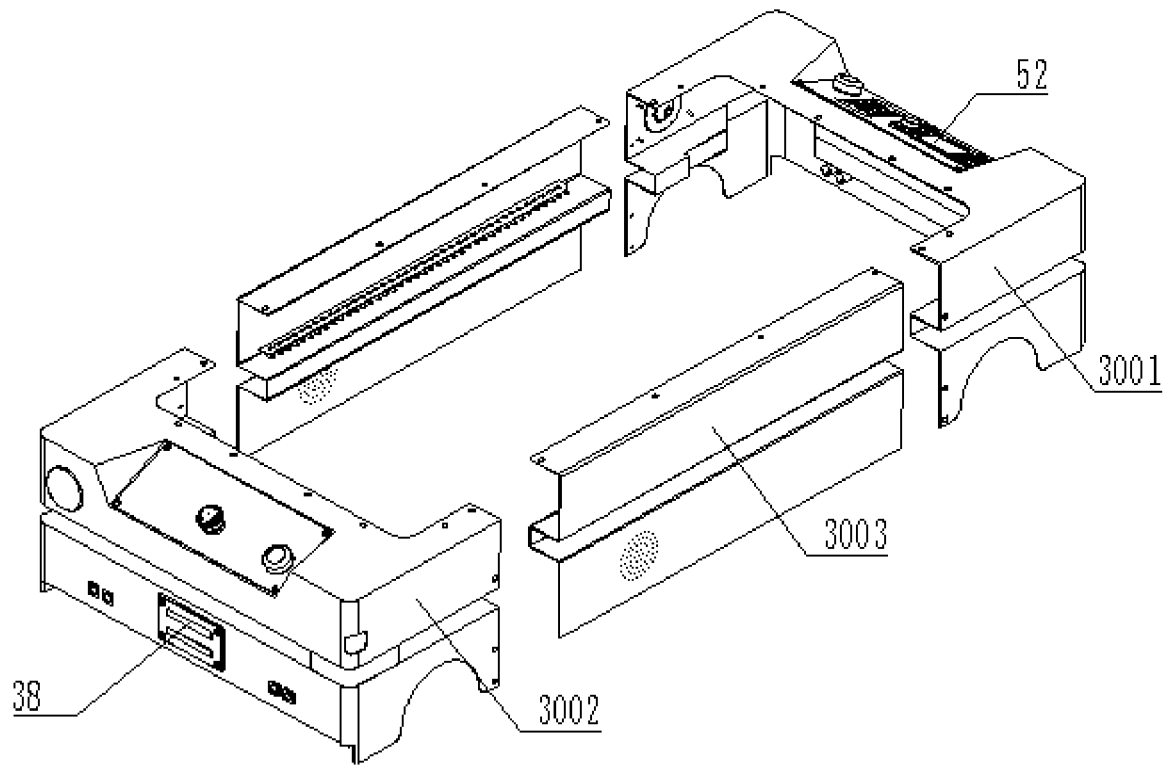
FIG. 15 is a schematically structural view of the housing of a carrying mobile robot of the present application.
Figure 16:
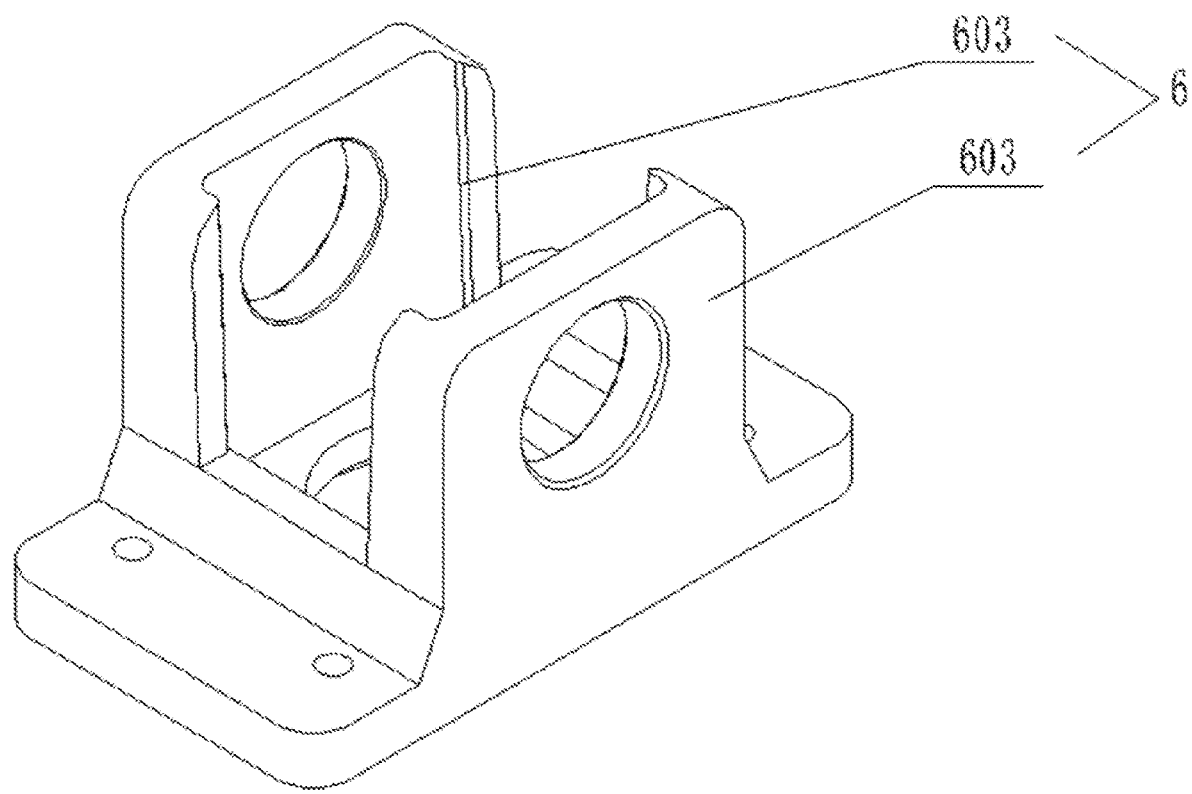
FIG. 16 is a schematic view of the connector of the present application.
Figure 17:
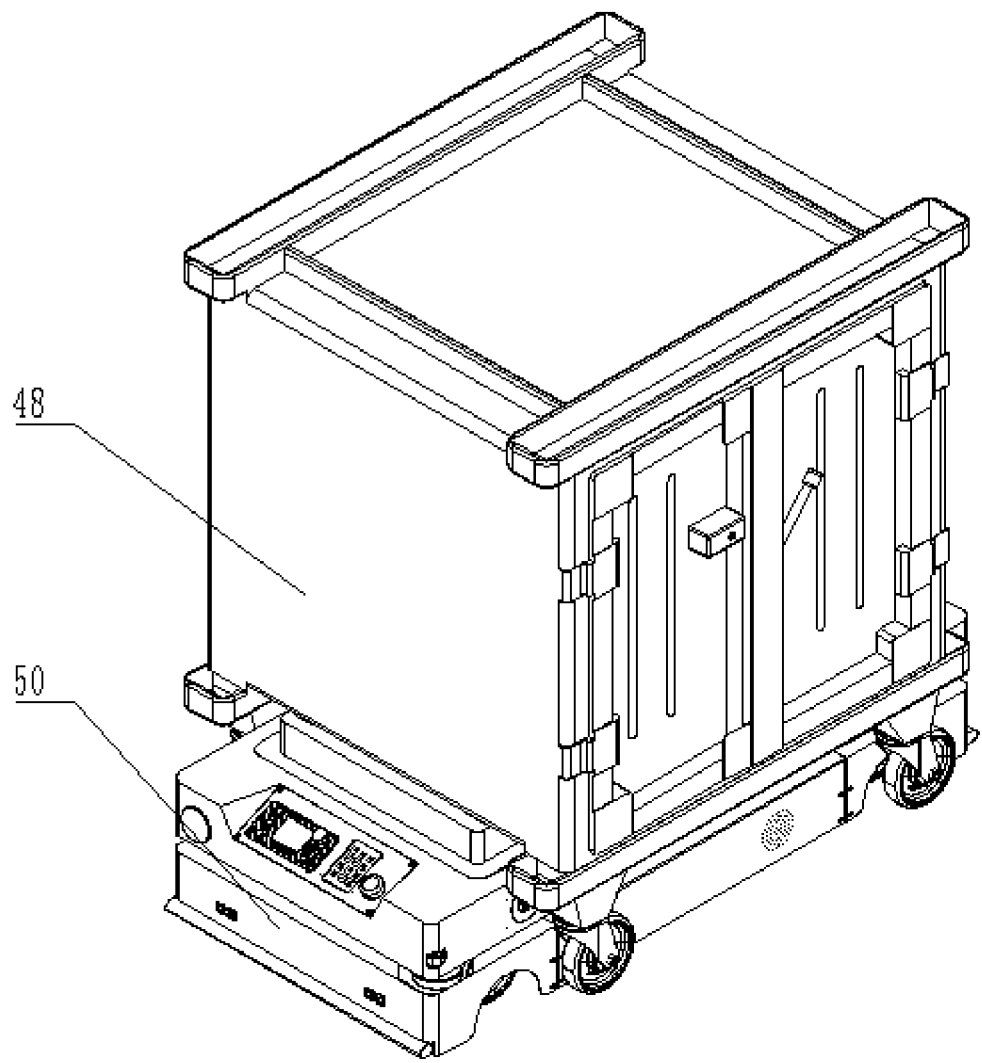
FIG. 17 is a schematic diagram of the carrying mobile robot in operation of the present application.
Figure 18:
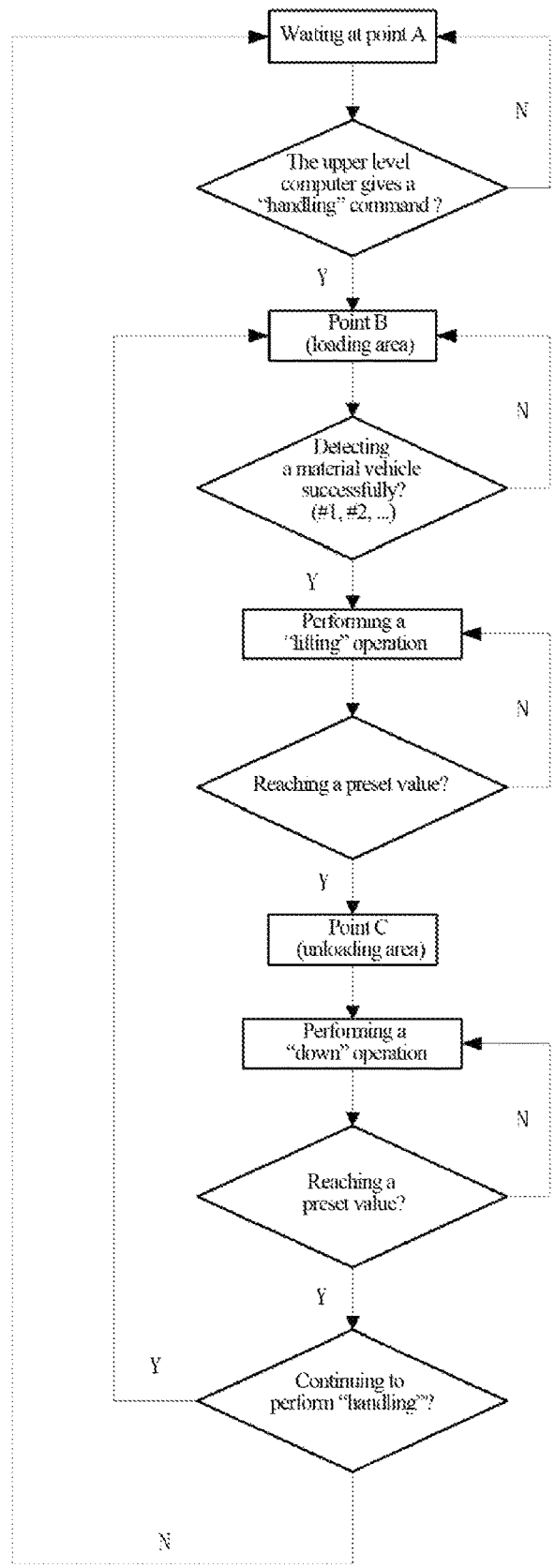
FIG. 18 is a flow chart of the working process of the present application.

See FIG. 1 to FIG. 18, a suspension system and a carrying mobile robot with the same are illustrated according to a preferred embodiment, wherein the carrying mobile robot includes a frame 14 and the suspension system disposed at the bottom of the frame 14. The suspension system comprises two suspension mechanisms arranged at the left and right: the left suspension mechanism 7 disposed on the left side of the frame 14 and the right suspension mechanism 9 disposed on the right side of the frame 14, respectively. In order to ensure that the carrying mobile robot of the present application can adapt to different road conditions and adapt to different loads, each suspension mechanism of the present application includes: a supporting beam 2 with an upper mounting surface and a lower mounting surface. The supporting beam 2 is provided with a driving wheel 4, a connecting member 6 and a first driven wheel 8. The first driven wheel and the driving wheel respectively support the front and rear ends of the supporting beam, i.e. the driving wheel 4 is arranged at the a rear end of the supporting beam 2, the first driven wheel 8 is disposed at a front end of the supporting beam 2, and the connecting member 6 is located at a mounting position between the driving wheel 4 and the first driven wheel 8. In order to make the contacting area of the frame 14 and the connecting member 6 is larger, the connecting member 6 of the present application has a horizontal connecting portion 601 above the upper mounting surface for mounting with the bottom of the frame 14. In order to achieve a uniform pressure without bending out of shape, the connecting member 6 of the present application is generally in an inverted "U" shape, which is mounted on the supporting beam 2 and includes a first vertical connecting portion 602 disposed on the left side of the supporting beam and the second vertical connecting portion 603 disposed on the right side of the supporting beam. The mounting position has a first mounting hole penetrating the supporting beam 2 in the left-right direction. The first mounting hole is provided with a detachable fixing rotating shaft 10. The first vertical connecting portion 602 and the second vertical connecting portion 603 are provided with a second hole through which the rotating shaft 10 can pass and the connecting member 6 can be rotatably connected around the axis of the rotating shaft 10. In the present application, the suspension mechanism is disposed at the bottom of the frame. When the frame has a load, the suspension mechanism can swing up and down around the rotating shaft. In order to reduce the wear between the connecting member and the rotating shaft 10 when the supporting beam 2 is swinging around the rotating shaft 10, a first sliding bearing 12 is disposed between the first vertical connecting portion 602 and the rotating shaft 10, whose inner ring is in clearance fit with the rotating shaft 10 and outer ring is in interference fit with a hole wall of the second through hole of the first vertical connecting portion. The second sliding bearing 13 is disposed between the second vertical connecting portion 603 and the rotating shaft 10. The inner ring of the second sliding bearing 13 is clearance-fitted with the gap of the rotating shaft 10, and the outer ring of the second sliding bearing 13 is in interference fit with the hole wall of the second through hole of the second vertical connecting portion 603.

In order to achieve smooth operation and uniform pressure, the driven wheel and the driving wheel 4 of the present application are respectively mounted on the lower mounting surface of the supporting beam 2. One side of the driving wheel 4 is provided with a driving assembly 6 for driving the driving wheel 4. The driving assembly 6 employs a linear configuration on the structural layout. The driving assembly 6 includes a first motor 501, a speed reducer 502, an encoder 503, and a brake. The output end of the first motor 501 is directly connected with the input end of the speed reducer 502 of the present invention. The speed reducer 502 of the present application is preferably a speed reducer 502 equipped with a flange output shaft 1804, having a strong radial load carrying capacity. The driving wheel 4 is fixedly connected with flange output shaft 1804 by a screw and a reducer 502. The brake is mounted on the rear side of the first motor 501. The encoder 503 is disposed at the rear end of the brake. The driving assembly 6 and the driving wheel 4 constitute a driving unit, which is fixed on the mounting bracket 505 by the mounting flange of the reducer 502, and the mounting bracket 505 is mounted to the lower mounting surface of the supporting beam 2 by screws.

The inside of the frame 14 of the present application is provided with a base plate 17. The base plate 17 is provided with a lifting mechanism. The lifting mechanism includes four sets of lifting member 16 respectively disposed at four corners of the base plate 17, a first driving system 18 for driving the lifting member 16, a transmission system 20 for transmitting the driving force of the first driving system 18 to the lifting member 16. The transmission system 20 includes four first follower pulleys 2001, each of which includes a set of ball screw nut pairs and a first mounting seat 1603 for mounting the ball screw nut pair. The first fixing seat 19 is disposed at a lower end of the mounting seat 1603. The first mounting seat 1603 is disposed on the base plate 17. The ball screw nut pair includes a ball screw 1601 and is sleeved on the ball screw 1601. A ball nut 1602 is adapted to fit the ball screw 1601. The first mounting seat 1603 having a mounting chamber that limits the ball nut 1602 in the axial direction of the ball screw 1601. A pulley connector 1604 is further disposed between the follower pulley and the ball nut 1602. One end of the pulley connector 1604 is connected to a follower pulley and the other end of the pulley connector 1604 is connected to the ball nut 1602. The ball screw nut pair of the present application has the characteristics of high precision, low friction coefficient, self-lubrication, etc., thus can greatly improve the mechanical efficiency and transmission precision of the lifting mechanism. Moreover, it is free of maintenance during the service life. The pulley connector 1604 is sleeved on the ball screw 1601. The inside of the connecting member 6 has a first annular groove 1605. The T-shaped small end of the ball nut 1602 is embedded in the first annular groove 1605, a notch of the first annular groove 1605 abuts against a surface of the T-shaped large end of the ball nut 1602. The outer wall of the connecting member 6 has a first annular boss 1606. The first annular boss 1606 is sleeved with a deep groove ball bearing 1607, and the inner ring lower end surface of the deep groove ball bearing 1607 is abutted against a step surface of the first annular boss 1606. The upper end of the outer ring of the deep groove ball bearing 1607 is abutted against the first mounting seat 1603. The lower end of the ball nut 1602 is provided with a lower supporting disk 1608. The lower supporting disk 1608 has a second annular groove and a boss extending away from the second annular groove. The lower support disk 1608 is sleeved on the ball screw 1601. The T-shaped large end of the ball nut 1602 is embedded in the second annular groove. The outer wall of the boss is sleeved with a tapered roller bearing 1609. The lower end surface of the tapered roller bearing 1609 abuts against the fixing seat 19. The upper end surface of the tapered roller bearing 1609 is abutted against the surface of the lower support plate 1608. The lower end of the ball screw 1601 passes through the bottom wall of the first mounting seat 1603. The upper end of the ball screw 1601 passes through a tray support frame 22 and is connected to a tray 24. The tray support frame 22 has a closed square shape, with one side fixed to the tray 24 by screws, and the other side locked with the ball screw 1601 by a lock nut. The ball screw is provided with a support frame connecting member for mounting the tray support frame. The upper surface of the tray 24 is further provided with an anti-slip pad 26 for increasing the friction between the robot and the material vehicle contact part, so that when the robot carrys the material vehicle during operation, it can be prevented that the materials slip during an emergency stop. The deep groove ball bearing 1607 of the present application is used for providing auxiliary support to the ball screw nut pair, preventing the ball screw 1601 from swinging around the axis during linear motion. Since the linear motion of the ball screw 1601 has a certain stroke, the present invention has a function of guidance, and there is no need to additionally provide a guiding mechanism, which greatly saves space and cost. The present application can finally transmit the axial force to the base plate 17 when the ball screw nut is lifted, and also since the base plate 17 is welded to the frame 14, for the carrying mobile robot of the present application, when the lifting of the large load is performed, its axial force generated by the lifting mechanism is finally dispersed to the frame 14. Since the ball nut 1602 is restrained by other parts, the axial direction is fixed and can only be rotated circumferentially. The ball screw 1601 is indirectly fixed to the tray support frame 22, and its circumferential rotation is restricted. Thus, the rotational movement of the ball nut 1602 will force the ball screw to produce a linear motion in the vertical direction, thereby achieving the up and down reciprocation of the tray support frame 22.

For the smoothness of the transmission, the transmission system 20 of the present application further includes a driving pulley 2002 disposed at the output end of the driving motor, a synchronous belt 2003 disposed on the base plate 17, a plurality of idlers 2004, and a plurality of second driven pulleys. The synchronous belt 2003 is connected to the driving pulley 2002, the first driving pulley 2001, the second follower pulley 2005, and the idler 2004, respectively, to realize that the driving pulley 2002 drives the first follower pulley 2001 and the second follower pulley 2005 to rotate simultaneously and synchronously through the synchronous belt 2003. There are four first follower pulleys 2001, which are respectively connected to the pulley connecting members 1604 of the respective lifting member 16 by screws. There are two second follower pulleys 2005, respectively disposed on the base plate 17 facing away from one side of the two lifting members 16 at one end of the driving motor. The idler 2004 is mounted on the base plate 17 and disposed on the side close to the follower pulley and the driving pulley 2002. There are five sets of idlers 2004, of which four sets of idlers 2004 adjacent to the first follower pulley 2001 has a fixed installation position, and a set of idler 2004 adjacent to the driving pulley 2002 can be adjusted in position and adjusted by a screw, so that the synchronous belt 2003 can be tensioned to ensure synchronization of the pulley movement in coordination. It is noted that the five sets of idlers 2004 of the present application are installed as close as possible to the first follower pulley 2001 or the driving pulley 2002, in order to increase the envelope angle of the pulley to improve the actual transmission capacity of the lifting member 16. The greater the envelope angle of the pulley, the greater the transmission capacity of the lifting member 16. Therefore, the axial load of the ball screw 1601 is larger within the range allowed by the axial load carrying capacity of the ball screw nut, thereby improving the actual lifting load capacity of the entire lifting mechanism.

The first driving system 18 includes a second motor 1801, a first stage synchronous belt 2003 mechanism, a second stage speed reducer 1803, an output shaft 1804, and a brake. The second motor 1801 outputs motion and power through the first stage synchronous belt 2003 mechanism and the second stage speed reducer 1803 to obtain an appropriate speed and torque and transmit it to the output shaft 1804 to drive the driving pulley 2002. The driving pulley 2002 then drives the four first follower pulleys 2001 to rotate through the synchronous belt 2003. The rotation of the first follower pulley 2001 causes the four sets of lifting members 16 to simultaneously generate a linear movement in the vertical direction, thereby achieving a smooth, synchronous lifting motion of the lifting mechanism. It is noted that the first driving system 18 of the present application is provided with a brake for ensuring that the lifting mechanism can self-lock in the event of a sudden power failure, ensuring the safety of the lifting motion. In addition, the brake is a permanent magnet type brake.

A second driven wheel 28 is further disposed at the bottom of the frame 14 away from the first driven wheel 8. There are two second driven wheels 28, which are the second driven wheel 28 on the same side with the left suspension mechanism 7 and the second driven wheel 28 on the same side with the right suspension mechanism 9.

The frame 14 of the present application adopts a welded frame structure, and the mechanical mechanism is strong and reliable. The frame 14 of the present application includes a frame body and an auxiliary frame 1402 respectively disposed at the front and rear ends of the frame body 1401. A sensor support frame 1403 is further disposed on the side wall of the frame body. When the carrying mobile robot of the present application is loaded, the weight is finally dispersed on the frame body 1401 and is carried by the frame body 1401. At the front end of the auxiliary frame 1402, an anti-collision edge 32 is disposed, and the sensor support frame 1403 is diagonally disposed on the frame body 1401 for mounting the laser sensor 34.

The application further includes a housing 30 that is housed on the frame 14. The housing 30 is fixed to the frame body 1401 by screws and is divided into a front housing 3001, a rear housing 3002 and two side housings 3003. In order to ensure the safety of the robot during heavy load operation, the robot is equipped with two laser sensors 34, two anti-collision edges 32, and four ultrasonic sensors 36. Wherein, two laser sensors 34 are respectively disposed on the sensor support frame 1403 to realize a diagonal arrangement of the two laser sensors 34, and each of the laser sensors 34 has a scanning range of at most 270°, so that the two laser sensors 34 are used synergistically. It can be used to detect all zone around 360° all around the robot body. Two anti-collision edges 32 are respectively disposed on the auxiliary frame 1402. When the anti-collision edge 32 is hit by a low obstacle, the internal electrical signal of the anti-collision edge 32 is triggered, and the system automatically notifies the robot to stop immediately, to ensure operational safety. The ultrasonic sensors 36 are mounted on the front casing 3001 and the rear casing 3002 respectively. The function of the ultrasonic sensors 36 is to detect the low obstacle combining the anti-collision edge 32 to provide double protection to the robot. The application also includes an electrical accessory that includes two horns 42, a battery, a control panel 52, two touch switches 40, two magnetic induction sensors 46, and a set of controllers 44, wherein the horns 42 are arranged on the two sides of the frame body 1401. The battery is a lithium iron phosphate battery, disposed in the middle of the frame body 1401. The control panel 52 is mounted on the front case 3001, the two touch switches 40 are respectively installed on the edge side of the front housing 3001 and the rear housing 3002 of the robot. The operator can stop or operate the robot by simply touching the switch with foot without bending, thereby improving human-friendliness. Two magnetic induction sensors 46 are symmetrically arranged on both sides of the middle portion of the frame body 1401. When the robot moves under the material vehicle, the magnetic induction sensor 46 detects the magnet fixed directly below the material vehicle, and when detected, the robot will immediately stop moving. Then, the next step is executed, the controller 44 is located in the middle of the frame body 1401 to perform overall regulation on the entire motion flow of the robot. The application further includes a charging port 38. The charging electrode of the charging port 38 is composed of two beryllium copper members. Both electrodes are fixed on an insulating member and then fixed on the rear housing 3002 by screws, matched with charging equipment, for performing autonomous charging or manual charging of the robot. The first driven wheel 8 and the second driven wheel 28 of the present application are respectively a universal caster.

The carrying mobile robot of the present application has large carrying capacity, and the operation is based on laser sensor full autonomous navigation, and does not need auxiliary equipments such as magnetic strips, landmarks, reflectors, etc., which is more convenient and reliable in practical use. The action flow of the carrying mobile robot of the present application when performing autonomous carrying material vehicle is described in detail below with reference to FIG. 17 and FIG. 18:

1) First, the robot of the present application stays at starting point A;
2) After receiving an execution "handling" command from the upper level computer, the robot 50 starts to move;
3) The robot 50 moves autonomously to point B (loading area) of the material vehicle, and positions below a No. 1 material vehicle 48 until the magnetic induction sensor on the robot detects the magnet directly below the No. 1 material vehicle 48, and the robot stops moving;
4) The lifting mechanism performs a "lifting" action. After the lifting stroke reaches a preset value and the No. 1 material vehicle is fully lifted, the lifting mechanism stops running and maintains the current state;
5) The robot carries No. 1 material vehicle to a point C (unloading area), and the robot stops running;
6) The lifting mechanism performs a "down" action, and the lifting mechanism stops when the descending stroke reaches a preset value and No. 1 material vehicle completely lands on the ground;
7) Robot moves, returns to point A and a cycle is ended, or continue to perform the above process 3)-6), carrying other numbered material vehicle, such as a No. 2 material vehicle, a No. 3 material vehicle, etc.

The carrying mobile robot of the present application adopts a suspension mechanism based on a lever balance, so that the downforce of the driving wheel to the ground alters with the load changing, which can effectively eliminate the phenomenon of "slipping" during the operation with a large load, and greatly improve the reliability of the robot during operation with a load. The carrying mobile robot of the present application is modular, which refers to that the entire suspension mechanism can be directly fixed on the frame body through a connecting member, so that the suspension mechanism is convenient to assemble and disassemble, and is convenient for later maintenance; the lifting mechanism of the present application is highly integrated and arranged. And the synchronous belt connects the movements of the lifting members at the four corners of the lifting mechanism in series to realize a linear lifting movement of the tray, and the lifting mechanism of the present application has a compact structure and small volume of integration occupied on the robot. At the same time, the lifting mechanism has a large stroke, which can achieve large load lifting.

The embodiments described above are only preferred embodiments for the purpose of fully illustrating the present application, but the scope of protection of the present application is not limited thereto. Equivalent substitutions or alterations made by those skilled in the art based on this application are within the protection scope of the present application. The protection scope of this application is defined by the claims.

The invention claimed is:

1. A carrying mobile robot, comprising a frame, characterized in that the frame further comprises a suspension system,
   the suspension system, comprising: two suspension mechanisms arranged on the left and right of a vehicle frame, respectively called a left suspension mechanism and a right suspension mechanism, each of the suspension mechanisms comprising a supporting beam, a driving wheel, a connecting member and a first driven wheel, the first driven wheel and the driving wheel respectively support front and rear ends of the supporting beam, and the connecting member is connected to the supporting beam and located between the driving wheel and the first driven wheel, the connecting member is generally in an inverted "U" shape, the connecting member includes a first vertical connecting portion disposed on a left side of the supporting beam, a second vertical connecting portion disposed on a right side of the supporting beam, and a horizontal connecting portion provided on an upper side of the supporting beam, the first vertical connecting portion and the second vertical connecting portion are rotatably connected to the supporting beam by a rotating shaft extending in a left-right direction;
   the left suspension mechanism and the right suspension mechanism are detachably connected to the bottom of the frame respectively, through the horizontal connecting portion of the connecting member; and
   the frame is provided with a base plate, the base plate is provided with a lifting mechanism; the lifting mechanism comprises a plurality of lifting members, a first driving system for driving the lifting member and a transmission system for transmitting a driving force of the first driving system to the lifting member, the transmission system comprises a plurality of follower pulleys; each of the lifting members includes a set of ball screw nut pairs and a first mounting seat for mounting the ball screw nut pair; a lower end of the first mounting seat is provided with a fixing seat the first mounting seat is disposed on the base plate; the ball screw nut pair includes a ball screw and a ball nut sleeved on the ball screw and matched with the ball screw; the fixing seat has a through hole for the ball screw; the first mounting seat has a pair of mounting chambers for axially limiting the ball nut; a pulley connector is further disposed between the follower pulley and the ball nut, with one end of the pulley connector connected to the follower pulley, and the other end of the pulley connector connected to the ball nut.

2. The carrying mobile robot according to claim 1, characterized in that: a first sliding bearing is disposed between the first vertical connecting portion and the rotating shaft; an inner ring of the first sliding bearing is in clearance fit with the rotating shaft; an outer ring of the first sliding bearing is in interference fit with a hole in a wall of the first vertical connecting portion; a second sliding bearing is disposed between the second vertical connecting portion and the rotating shaft; the inner ring of the second sliding bearing is in clearance fit with the rotating shaft; the outer ring of the second sliding bearing is in interference fit with a hole in a wall of the second vertical connecting portion.

3. The carrying mobile robot according to claim 1, characterized in that: the driving wheel and the first driven wheel are both disposed on a lower mounting surface of the supporting beam; one side of the driving wheel is provided with a driving assembly for driving the driving wheel; the driving assembly is arranged in a line in the axial direction of the driving wheel; the driving assembly comprises a mounting flange; the mounting flange and the lower mounting surface of the supporting beam are connected.

4. The carrying mobile robot according to claim 1, characterized in that: the pulley connector is sleeved on the ball screw and the inside of the connector has a first annular groove; a T-shaped small end of the ball nut is embedded in the first circular annular groove; a notch of the first annular groove abuts against the surface of the T-shaped large end of the ball nut; the outer wall of the connector has a first annular boss; a deep groove ball bearing is sleeved on the first annular boss, the lower end surface of the inner ring of the deep groove ball bearing abuts against a step surface of the first annular boss, the upper end of the outer ring of the deep groove ball bearing abuts against the first mounting seat; the lower end of the ball nut is provided with a lower support disk; the lower support disk has a second annular groove and a boss extending away from the second annular groove; the lower support disk is sleeved on the ball screw; a T-shaped large end of the ball nut is embedded in the second annular groove; the outer wall of the boss is provided with a tapered roller bearing; the lower end surface of the tapered roller bearing is abutted against the fixing seat; the upper end surface of the tapered roller bearing abuts against the surface of the lower support disk.

5. The carrying mobile robot according to claim 1, characterized in that: the first driving system of the lifting mechanism comprises a driving motor; the transmission system comprises a driving pulley provided at an output end of the driving motor, a synchronous belt and a plurality of idlers disposed on the base plate; the synchronous belt is connected with the driving pulley, the follower pulley and the idlers.

6. The carrying mobile robot according to claim 5, characterized in that: four lifting members are respectively disposed at four corners of the base plate; four of six follower pulleys are disposed on the ball screw, and the other two are respectively disposed on one side of the two lifting members facing away from one end of the driving motor; five idlers are respectively disposed adjacent to the lifting members and one side of the driving pulley, wherein the idler adjacent to the driving pulley is disposed on a position adjustable mechanism to adjust tension of the synchronous belt.

7. The carrying mobile robot according to claim 1, characterized in that: the upper end of the ball screw is provided with a tray support frame; the tray support frame is provided with a tray; the tray is provided with an anti-skid pad along longitudinal direction.

8. The carrying mobile robot according to claim 1, characterized in that: a second driven wheel is further disposed at an end of the bottom of the frame facing away from the first driven wheel; and there are two second driven wheel, which are a second driven wheel on the same side with the left suspension mechanism and a second driven wheel on the same side with the right suspension mechanism.

* * * * *